United States Patent [19]
Ludtke et al.

[11] 3,817,179
[45] June 18, 1974

[54] PARACHUTE PACK WITH RELEASE MECHANISM

[75] Inventors: William P. Ludtke; Carl R. Peterson, both of Silver Spring, Md.

[73] Assignee: The United States of America as represented by the Secretary of the Navy, Washington, D.C.

[22] Filed: July 21, 1966

[21] Appl. No.: 567,335

[52] U.S. Cl. .................................. 102/4, 294/83 A
[51] Int. Cl. ............................................ F42b 25/02
[58] Field of Search ........ 102/4; 244/138, 142, 149, 244/152; 294/83

Primary Examiner—Samuel W. Engle
Attorney, Agent, or Firm—R. S. Sciascia; J. A. Cooke; L. J. Santisi

EXEMPLARY CLAIM

1. A parachute assembly for an aircraft launched mine comprising, a rupturable casing wherein the parachute is initially disposed in a folded condition, a static line connected between said parachute and the aircraft, means for retaining said static line in a folded condition until after mine launching and then releasing said static line to permit maximum extension thereof, a release mechanism initially connected to the mine, a riser line connected between said parachute and said release mechanism for effecting spacing of said release mechanism and mine from said parachute, means for retaining said riser line in a folded condition until after mine launching and then releasing said riser line to permit maximum extension thereof, and means formed on said casing for effecting rupturing thereof upon maximum extension of said riser line and said static line thereby effecting release of said parachute from said container by said static line.

6 Claims, 4 Drawing Figures

3,817,179

INVENTORS
William P. Ludtke
Carl R. Peterson

BY  J.O. Tresansky
ATTORNEY

INVENTORS
William P. Ludtke
Carl R. Peterson

BY J.O. Tresansky
ATTORNEY

PARACHUTE PACK WITH RELEASE MECHANISM

The invention described herein may be manufactured and used by or for the Government of the United States of America for governmental purposes without the payment of any royalties thereon or therefor.

The present invention relates to a parachute pack assembly and release mechanism, and more particularly to a parachute pack and release mechanism that can be used to deliver a mine or similar device from low speed, low altitude aircraft to an impact area in the water.

When deploying mines, or similar-type devices, to a water impact area from low flying, low speed aircraft, such as helicopters or relatively slow flying cargo planes, from altitudes as low as 40 or 50 feet, two major problems are encountered. The first problem results from the manner of deployment as the mines are usually manually ejected from an open cargo door or rolled down a ramp of an open cargo hatch of the delivering aircraft. Because of this relatively uncontrolled method of launching the mine, there is a tendency for the mine to become entangled in the shroud lines of the opening parachute, thus resulting in failure of the parachute to open completely. The second problem is encountered due to the relatively low altitude of deployment as the mine usually does not have sufficient time before water entry to become vertically stable along the drop trajectory. Thus, at water entry the mine may be oscillating as much as 90° from the line of trajectory and may impact the water broadside.

Prior art parachute release mechanisms developed for higher drop altitudes rely on the mine striking the water in a very nearly vertical position. Devices of this character utilizing inertia weight release mechanisms or hydrostatic pressure release mechanisms are not entirely reliable where the mine strikes the water at angles of impact approaching 90° from the vertical. As a result, prior art devices used for mine launchings at low altitude have proved unreliable in separating the mine from the parachute delivery system. As a result, these release mechanisms fail to operate and the parachute delivery system remains attached to the mine in the water thereby causing the parachute to become entangled with the mine and making the mine more readily detectable.

The general purpose of this invention is to provide a parachute delivery system and release mechanism for an aerial launched object to a water impact area from a low altitude, low speed aircraft with a high degree of reliability.

An object of the present invention is the provision of a parachute delivery system for a mine which provides for a uniform deployment of the shroud lines to minimize entanglement of the lines with the mine.

Another object is to provide a release mechanism for a parachute delivery system which will operate with a high degree of reliability for angles of impact approaching 90° from the vertical.

A further object of the instant invention is the provision of a parachute delivery system and release mechanism which will operate only upon water impact and not during the period of descent.

Still another object is to provide a parachute delivery system which spaces itself from the mine before parachute opening and deployment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1A:
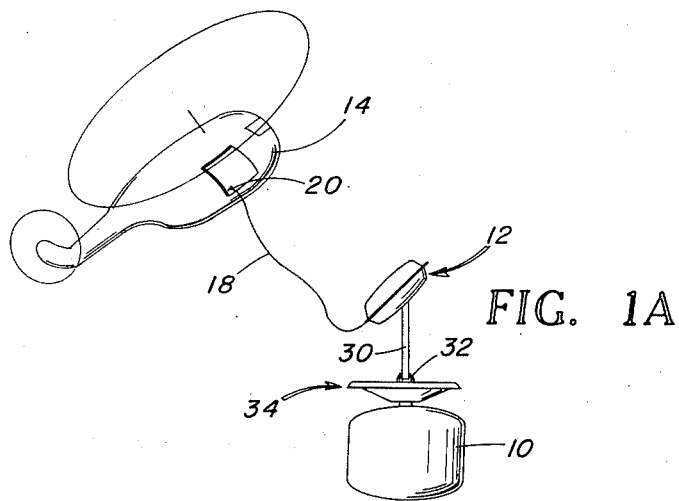
FIG. 1A depicts diagrammatically and in a general manner the operational delivery sequence characteristics of the parachute system.
Figure 1B:
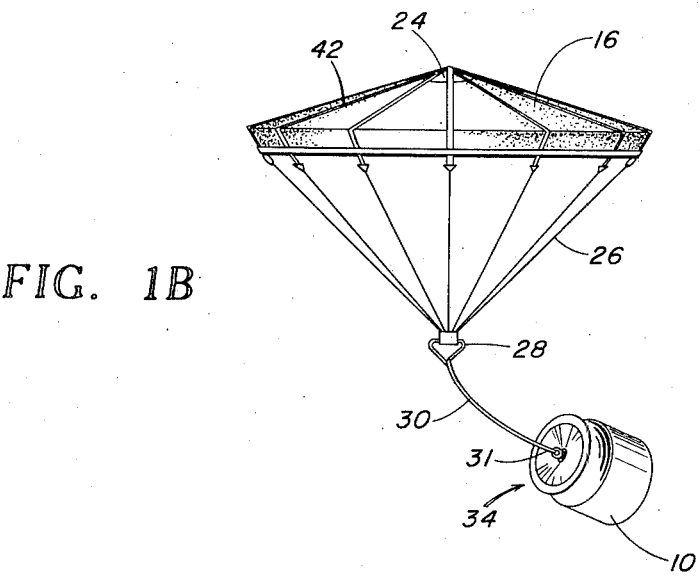
FIG. 1B shows the parachute system and mine just before water impact.

Referring first to FIGS. 1A and 1B there is shown diagrammatically an aerial load, such as a mine 10 and the parachute pack or casing shown generally at 12 and, in a general manner, its air flight path and the sequence of events therealong which lead to delivery of the mine to a water impact area from a delivery vehicle, such as a helicopter 14. Included in the mine delivery system, described hereinafter in greater detail, are a parachute 16 having a static line 18 with one end secured to the helicopter 14 and the other end 22, FIG. 2, releasably secured to the apex portion 24 of the parachute 16. The parachute shroud lines 26 are attached to a support ring 28 which is in turn attached to a riser line 30. One end 31 of the riser line 30 is secured to a securing ring 32 on the parachute release mechanism, shown generally at 34, and which is releasably secured to the mine 10.

Figure 2:
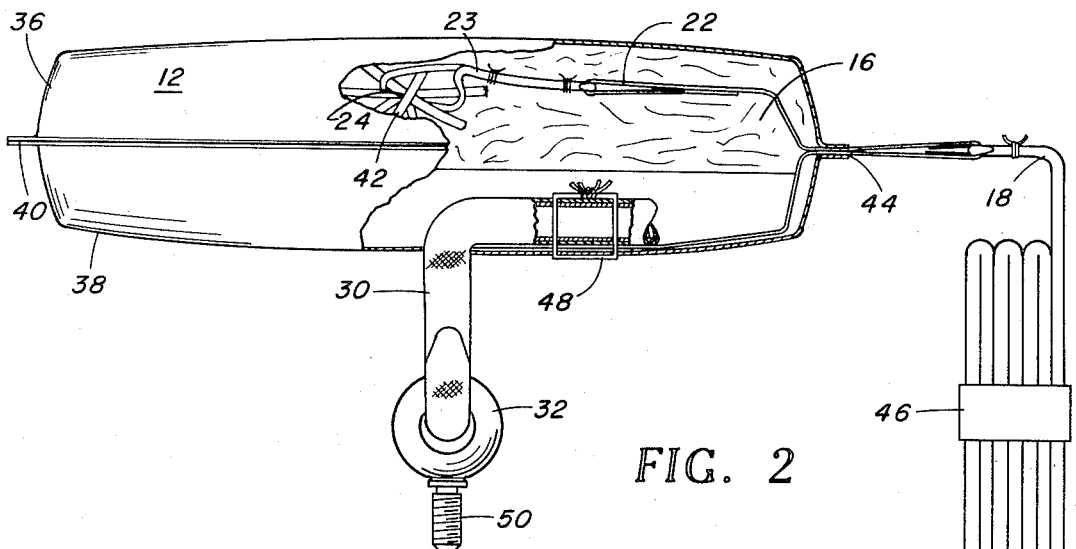
FIG. 2 is a view partly in section illustrating the parachute pack and assembly.

Referring now to FIG. 2 for details of the parachute pack there is shown a top parachute pack cover 36 and a bottom parachute pack cover 38 peripherally joined by tearthread stitching 40 that is so designed as to break and part upon the application of an oppositely directed force such that the two cover portions separate to allow the parachute canopy 16 to deploy. The parachute canopy 16 and shroud lines 26, as shown in FIG. 1B, are suitably folded within the parachute pack and an end 22 of the static line 18 is connected to a weak link member 23 designed to break upon application of a predetermined force. In turn the weak link is suitably attached at the apex of the parachute canopy to radiating tie members 42 of the parachute canopy at the apex portion 24. The static line 18 protrudes through an opening 44 in the parachute pack cover and is folded accordion fashion and bound with a suitable weak binding material 46, such as a pressure sensitive tape, such that when the parachute pack is ejected from the aircraft the downward force exerted on the static line by the parachute pack assembly will break the binding on the static line and pay out the static line. The riser line 30 is also suitably folded inside the parachute pack and is bound by a weak binding material 48 such that upon application of a force on the riser line the weak binding material will break and the full extent of the riser line will be extended. The extremity of the riser line 30 is suitably connected to securing ring 32 which has a threaded shank member 50 to engage the parachute release mechanism assembly 34.

Figure 3:
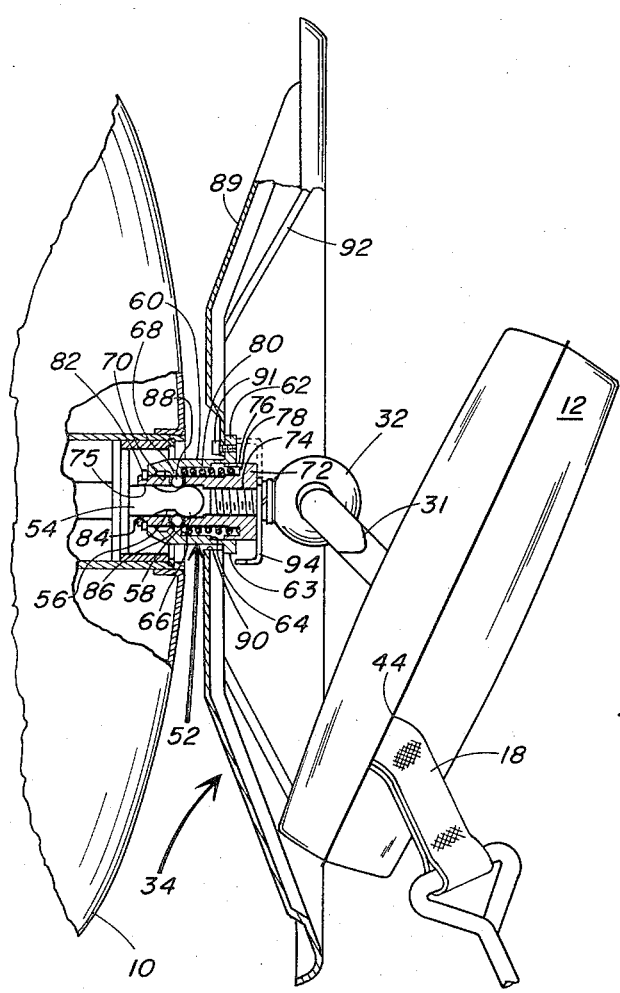
FIG. 3 is a view partly in section showing the release mechanism with an attached mine and a parachute pack.

Referring now to FIG. 3 for details of the release mechanism and the attached parachute pack, the mine 10 is shown as releasably connected to the release mechanism 34 by means of a ball release mechanism 52. The mine 10 has a protruding cylindrical stud member 54 with an indented necked-down portion 56 and a spherical end portion 58. The release mechanism 52 includes an outer sleeve portion 60 having an essentially circular flange portion 62 with one side 63 cut off so that the flange at 63 has a flattened shorter portions. The inner portions of the sleeve 60 is recessed in stages to provide a first abutting shoulder at 64, a second abutting shoulder at 66, a nodular extension 68 and below the nodular extension 68 there is provided a recessed portion 70. An inner sleeve 72, centrally threaded at 74 to receive the threaded shank portion 50 of the load support ring 32 and having a bore 75 to receive the cylindrical stud member 54, fits concentrically within the outer sleeve 60. The top part of the sleeve 72 is provided with an annular portion 76 that is designed to abut against shoulder 64 of the outer sleeve when the inner sleeve is fully inserted into the outer sleeve. In the recess 78 formed by the annular portion 76 one end of a compression spring 80 is disposed while the other end thereof abuts against the shoulder 66 of the outer sleeve such that a force is placed on the two sleeves urging relative axial movement therebetween thereby tending to separate them. A retaining ring 82 fits into a receiving groove 84 on the inner sleeve and limits the relative axial movement between the two sleeves.

The inner sleeve 72 is provided with a series of spaced bores or apertures 86 for slidably retaining a series of detent or retaining balls 88. When the release mechanism is in the locked position the balls 88 are forced by the protruding nodular extension 68 into the recessed necked-down portion 56 of the protruding stud 54 that is attached to the mine 10. When a force is imparted to the outer sleeve, the spring 80 is compressed and the nodular portion 68 of the outer sleeve passes over the detent balls 88. The balls can now retract somewhat into the recessed portion 70 in the outer sleeve and thus allow all the spherical end portion 58 of the protruding stud 54 to pass out of the bore 75 in the inner sleeve thus releasing the mine 10 from the mechanism.

The releasing force is imparted to the outer sleeve 60 by means of a impact disc 89 having a central aperture 90 and attached to the outer sleeve at the flanged portion 62 by means of suitable bolts 91. The surface area of the disc is made great enough to transmit the impact force due to the water entry to the outer sleeve 60 of the release mechanism and thus to compress the compression spring 80 to allow the spherical end portion of the protruding stud to retract and thus separate the entire mechanism from the mine. The inner sleeve member 72 and the threaded securing ring member 32 extend through the aperture 90 to the inner side of the disc 89. The disc can be made from any suitable plastic or metallic material and is formed generally in the shape of a hollowed-out dish. Strengthening grooves or ribs 92 may be added to impart greater rigidity to the disc.

A locking bar 94 may be employed to prevent inadvertent actuation of the release mechanism. During assembly the bar, generally having the configuration of an L-shaped member, is located at the shortened portion 63 of the flange, more clearly shown in FIG. 3, and after the release mechanism has been assembled onto the mine the bar is turned to the position shown in phantom lines so that it abuts the wider portion 62 of the flange and thus prevents inadvertent movement of the outer sleeve. The material for the locking bar 94 is selected so as to readily deform upon impact with the water so that the sleeve 60 will be forced upward and deform the locking bar and actuate the release mechanism 34.

In operation the parachute pack and release mechanism operates in the following manner. The static line 18 is fixedly attached to a part of the delivering aircraft or helicopter, the mine and parachute pack assembly is then manually ejected from the opened cargo hatch of the delivery aircraft, the binder 46 on the static line is broken and the static line starts to pay out. During the first moments of the delivery the binder 48 on the riser line breaks and the riser line pays out thus causing the mine 10 and release mechanism 34 to separate from the parachute pack 12. At maximum expansion of static line 18 and the riser line 30 an oppositely directed force is imposed upon the parachute pack and the tear-threads 40 are ruptured thus separating the two halves of the parachute pack. The static line, being attached to the apex portion of the parachute 16, then pulls the parachute canopy out of its pack permitting it to open and deploy fully. The weak connecting link 23 between the static line and the parachute canopy then breaks and the parachute and mine now begin free fall descent. Upon impact with the water entry area the mine quickly submerges and the disc 89 sharply impacts the water surface. Due to the shape of the disc a lifting force is imparted from negative pressure on the back side of the disc thus facilitating the releasing force. The force of impact pushes the disc upward deforming the locking bar 94 and causing the outer sleeve 60 to compress the compression spring 80 within the release mechanism thus allowing the detent balls to retract into recess 70 in the outer sleeve and allowing the spherical end portion to retract completely from the release mechanism. Thus the mine is completely separated from the parachute delivery system immediately after water impact.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A parachute assembly for an aircraft launched mine comprising, a rupturable casing wherein the parachute is initially disposed in a folded condition, a static line connected between said parachute and the aircraft, means for retaining said static line in a folded condition until after mine launching and then releasing said static line to permit maximum extension thereof, a release mechanism initially connected to the mine, a riser line connected between said parachute and said release mechanism for effecting spacing of said release mechanism and mine from said parachute, means for retaining said riser line in a folded condition until after mine launching and then releasing said riser line to permit maximum extension thereof, and means formed on said casing for effecting rupturing thereof upon maximum extension of said riser line and said static line thereby effecting release of said parachute from said container by said static line.

2. The device of claim 1 wherein said release mechanism includes means responsive to water impact to actuate said release mechanism and release said mine for submergence in the water wherein, said means responsive to water impact is secured to a first sleeve member, a second sleeve member located within and substantially concentric to said first sleeve member, resilient means urging said first sleeve member and said second sleeve member to relative axial movement, whereby an impact received by said means responsive to water impact is transferred to said outer sleeve member to move said outer sleeve member against the action of said resilient means relative to said inner sleeve member to permit said releasing mechanism to release said mine.

3. The device of claim 1 wherein said release mechanism includes a dish shaped impact means, said dish shaped means having a central aperture therein, a first substantially cylindrical sleeve member having a flanged portion at one end, said flanged portion of said first sleeve member being adapted to be secured to said dish shaped member at said central aperture therein, a second substantially cylindrical sleeve member oriented within and substantially concentric to said first sleeve member, compression spring means urging said first sleeve means and said second sleeve means to relative axial movement, limiting means to limit the degree of relative axial movement of said first sleeve means and said second sleeve means, a series of circumferentially spaced apertures in said second sleeve means, retaining balls housed within said circumferentially spaced apertures, a nodular extension on said first sleeve normally registering with said series of circumferentially spaced apertures to urge said retaining balls radially inward, such that upon application of a force on said impact dish said first sleeve means is urged to move against the action of said compression spring means relative to said second sleeve member to cause said nodular extension on said first sleeve means to move out of registry with said circumferentially spaced apertures and allow said retaining balls to retract.

4. The device of claim 1 wherein said rupturable casing includes a first cover and a second cover peripherally joined by a series of tear-thread stitching such that upon application of an oppositely disposed force said tear-thread stitching will rupture causing said first cover to separate from said second cover.

5. The device of claim 1 wherein said means for retaining said static line and said riser line in a folded condition includes a weak binder material such that upon application of a force said binder material breaks thereby allowing said static line and said riser line to extend fully.

6. The device of claim 1 wherein said connection between said static line and said parachute includes a weak connecting link such that upon application of a predetermined force said weak connecting link will break thereby releasing said parachute for free flight descent.

* * * * *